(12) United States Patent
Kageyama et al.

(10) Patent No.: US 9,664,123 B2
(45) Date of Patent: May 30, 2017

(54) VEHICLE CONTROL DEVICE AND VEHICLE CONTROL METHOD

(71) Applicant: NISSAN MOTOR CO., LTD., Yokohama-shi, Kanagawa (JP)

(72) Inventors: Yuzo Kageyama, Isehara (JP); Takahiro Yoshino, Yokosuka (JP); Masashi Ono, Sagamihara (JP); Masahiro Iriyama, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/421,217

(22) PCT Filed: Jun. 14, 2013

(86) PCT No.: PCT/JP2013/066447
§ 371 (c)(1),
(2) Date: Feb. 12, 2015

(87) PCT Pub. No.: WO2014/027501
PCT Pub. Date: Feb. 20, 2014

(65) Prior Publication Data
US 2015/0204254 A1     Jul. 23, 2015

(30) Foreign Application Priority Data

Aug. 16, 2012  (JP) .................. 2012-180555

(51) Int. Cl.
*B60T 7/12* (2006.01)
*F02D 29/02* (2006.01)
(Continued)

(52) U.S. Cl.
CPC ............. *F02D 29/02* (2013.01); *B60W 10/06* (2013.01); *B60W 10/10* (2013.01);
(Continued)

(58) Field of Classification Search
CPC .................................................. F02D 41/0002
(Continued)

(56) References Cited

U.S. PATENT DOCUMENTS 5,019,989 A     5/1991   Ueda et al.
5,159,990 A *  11/1992   Abe ....................... B60K 28/16
                                                           180/197
(Continued)

FOREIGN PATENT DOCUMENTS

CN       102574523 A    7/2012
JP       2-149737 A     6/1990
(Continued)

*Primary Examiner* — John Kwon
(74) *Attorney, Agent, or Firm* — Foley & Lardner LLP (57) ABSTRACT

A vehicle control device for controlling a vehicle with an engine includes a target engine output calculation unit configured to calculate a target engine output based on a target drive force, a vehicle speed and an air density, and a target engine torque calculation unit configured to calculate a target engine torque based on the target engine output and the air density. The target engine output calculation unit is configured to set a smaller target engine output when the air density is low than when the air density is high, and the target engine torque calculation unit is configured to set a larger target engine torque when the air density is low than when the air density is high.

5 Claims, 13 Drawing Sheets (51) Int. Cl.
*F02D 29/06* (2006.01)
*B60W 10/06* (2006.01)
*B60W 10/10* (2012.01)
*F02D 31/00* (2006.01)
*F02D 41/02* (2006.01)
*F02D 11/10* (2006.01)

(52) U.S. Cl.
CPC ............ *F02D 11/105* (2013.01); *F02D 29/06* (2013.01); *F02D 31/00* (2013.01); *F02D 31/001* (2013.01); *F02D 41/0215* (2013.01); F02D 2200/0414 (2013.01); F02D 2200/501 (2013.01); F02D 2200/602 (2013.01); F02D 2200/703 (2013.01); F02D 2250/18 (2013.01)

(58) Field of Classification Search
USPC .... 701/103, 104, 110, 114; 123/434, 406.23
See application file for complete search history.

(56) References Cited

U.S. PATENT DOCUMENTS

| | | | |
|---|---|---|---|
| 7,918,762 B2 | 4/2011 | Muta et al. | |
| 8,509,980 B2 | 8/2013 | Abe et al. | |
| 2010/0116248 A1* | 5/2010 | Kawai | F02B 31/085 123/406.23 |
| 2012/0185119 A1* | 7/2012 | Abe | B60K 6/48 701/22 |
| 2013/0282256 A1* | 10/2013 | Watanuki | F02D 23/02 701/102 |

FOREIGN PATENT DOCUMENTS

| | | |
|---|---|---|
| JP | 2001-47892 A | 2/2001 |
| JP | 2007-216900 A | 8/2007 |
| WO | WO 2007/094278 A1 | 8/2007 |
| WO | WO 2011/114566 A1 | 9/2011 |

* cited by examiner

VEHICLE CONTROL DEVICE AND
VEHICLE CONTROL METHOD

TECHNICAL FIELD

The present invention relates to a vehicle control and a vehicle control method.

BACKGROUND ART

To improve fuel economy of an engine in a vehicle, the vehicle is controlled by calculating a target drive force based on a vehicle speed and an accelerator pedal opening and calculating a speed ratio and a target engine torque in accordance with an optimal fuel consumption line.

The engine combusts fuel by taking in air. Since an air density is low, for example, in the case of traveling in highland, an actual engine torque may become lower than a target engine torque, the vehicle may not be controlled in accordance with the optimal fuel consumption line and fuel economy may be deteriorated even if the target engine torque is calculated in accordance with the optimal fuel consumption line and the engine is controlled to achieve the target engine torque.

Contrary to this, in an invention described in JP2001-47892A, a target engine torque is calculated based on an air density and a reduction of an actual engine torque due to the air density is suppressed by controlling an engine based on the calculated target engine torque.

SUMMARY OF INVENTION

The above invention has a problem that, if the air density is low, the engine torque reaches an upper limit value when an accelerator pedal opening is in an intermediate opening region, and an increase amount of an engine output in relation to the depression of an accelerator pedal becomes smaller to reduce driving performance of the vehicle when the accelerator pedal is further depressed thereafter.

The present invention was developed to solve such a problem and aims to suppress a reduction in driving performance of a vehicle even if an air density is low.

A vehicle control device according to one aspect of the present invention is a vehicle control device for controlling a vehicle with an engine and includes target drive force calculation means configured to calculate a target drive force based on a driving state of the vehicle, vehicle speed detection means configured to detect a vehicle speed of the vehicle, air density calculation means configured to calculate an air density, target engine output calculation means configured to calculate a target engine output based on the target drive force, the vehicle speed and the air density, and target engine torque calculation means configured to calculate a target engine torque based on the target engine output and the air density. The target engine output calculation means is configured to set a smaller target engine output when the air density is low than when the air density is high. The target engine torque calculation means is configured to set a larger target engine torque when the air density is low than when the air density is high.

Embodiments of the present embodiment and advantages of the present embodiments are described in detail below with reference to the accompanying drawings.

DESCRIPTION OF EMBODIMENTS

Figure 1:
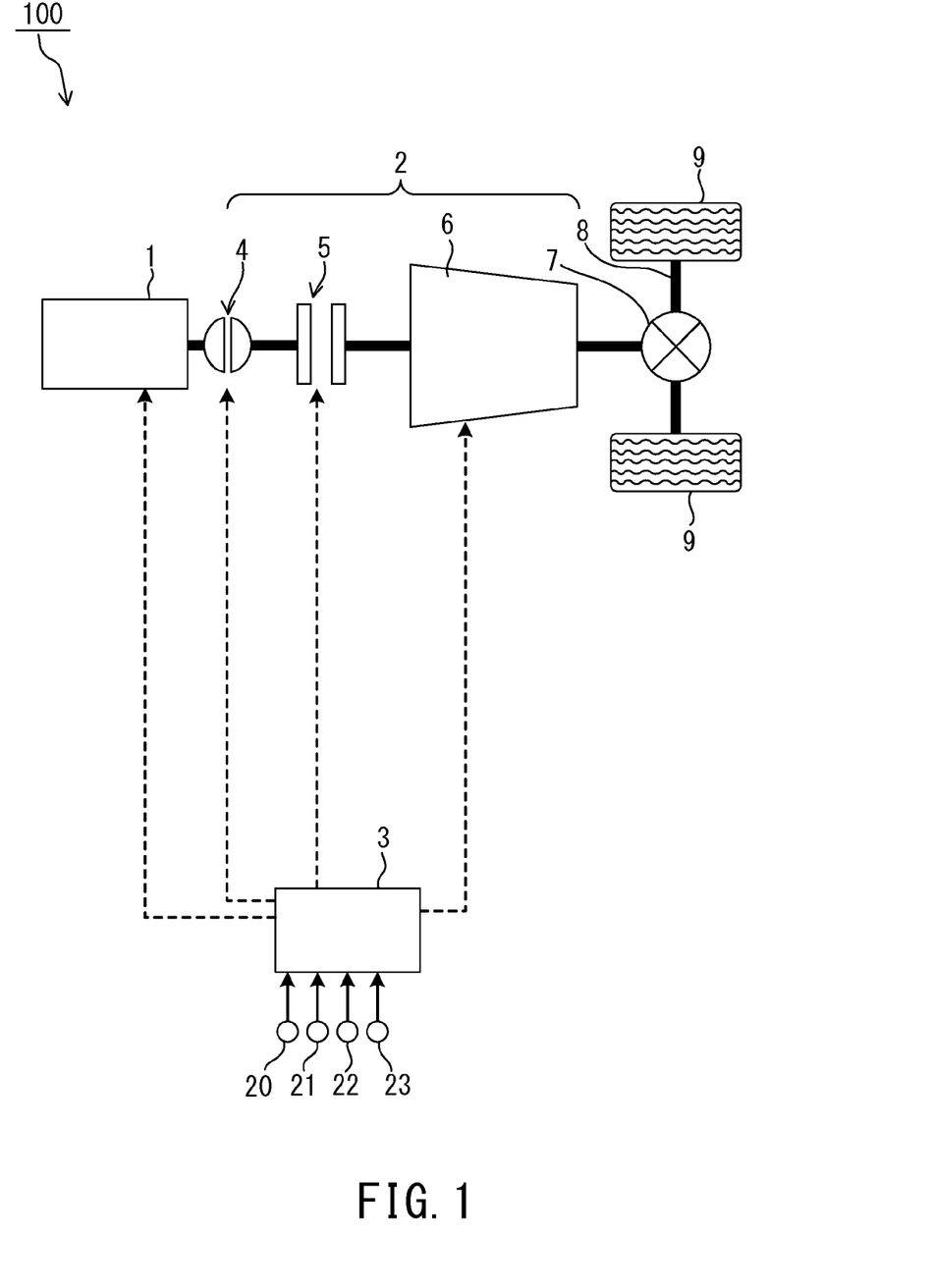
FIG. 1 is a schematic configuration diagram of a vehicle of a first embodiment.

A vehicle 100 of a first embodiment of the present invention is described using FIG. 1. FIG. 1 is a schematic configuration diagram of the vehicle 100 of the present embodiment.

The vehicle 100 includes an engine 1 as a motive power source, a drive system 2 for transmitting an output of the engine 1 to wheels 9 and a controller 3 for controlling the engine 1 and the drive system 2.

The drive system 2 includes a torque converter 4, a forward/reverse switching mechanism 5, an automatic transmission 6, a final reduction differential device 7 and drive shafts 8.

The torque converter 4 includes a lock-up clutch (not shown). The torque converter 4 is switched to a lock-up state where the lock-up clutch is completely engaged, a converter state where the lock-up clutch is completely released and a slip state where the lock-up clutch is half-engaged.

The forward/reverse switching mechanism 5 includes a planetary gear set as a main constituent element and switches a rotation transmitting state between the engine 1 and the automatic transmission 6 by engaging or releasing a forward clutch and a reverse brake. The forward/reverse switching mechanism 5 transmits rotation produced in the engine 1 without changing a rotating direction when the forward clutch is engaged and the reverse brake is released, and transmits the rotation produced in the engine 1 while reversing the rotating direction when the forward clutch is released and the reverse brake is engaged.

The automatic transmission 6 is a continuously variable transmission including a primary pulley, a secondary pulley and a belt mounted on the primary pulley and the secondary pulley. A speed ratio is changed by changing a contact radius of the belt and each pulley.

The final reduction differential device 7 is an integrated assembly of a final speed reducer and a differential device and transmits rotation transmitted from an output shaft of the automatic transmission 6 to the left and right drive shafts 8 after reducing the speed of the rotation. Further, the final reduction differential device 7 automatically gives a speed difference to enable smooth traveling when it is necessary to create a speed difference between the rotation speeds of the left and right drive shafts 8 such as at the time of traveling on a curve. The wheel 9 is mounted on the tip of each of the left and right drive shafts 8.

The controller 3 is configured by a microcomputer including a central processing unit (CPU), a read-only memory (ROM), a random access memory (RAM) and an input/output interface (I/O interface).

To the controller 3 are input a signal from an accelerator pedal opening sensor 20 for detecting an accelerator pedal opening, a signal from an atmospheric pressure sensor 21 for detecting an atmospheric pressure around the vehicle 100, a signal from a temperature sensor 22 for detecting an outside temperature, a signal from a vehicle speed sensor 23 for detecting a vehicle speed and the like. The controller 3 controls the engine 1, the torque converter 4, the forward/reverse switching mechanism 5 and the automatic transmission 6 based on the input signals.

Figure 2:
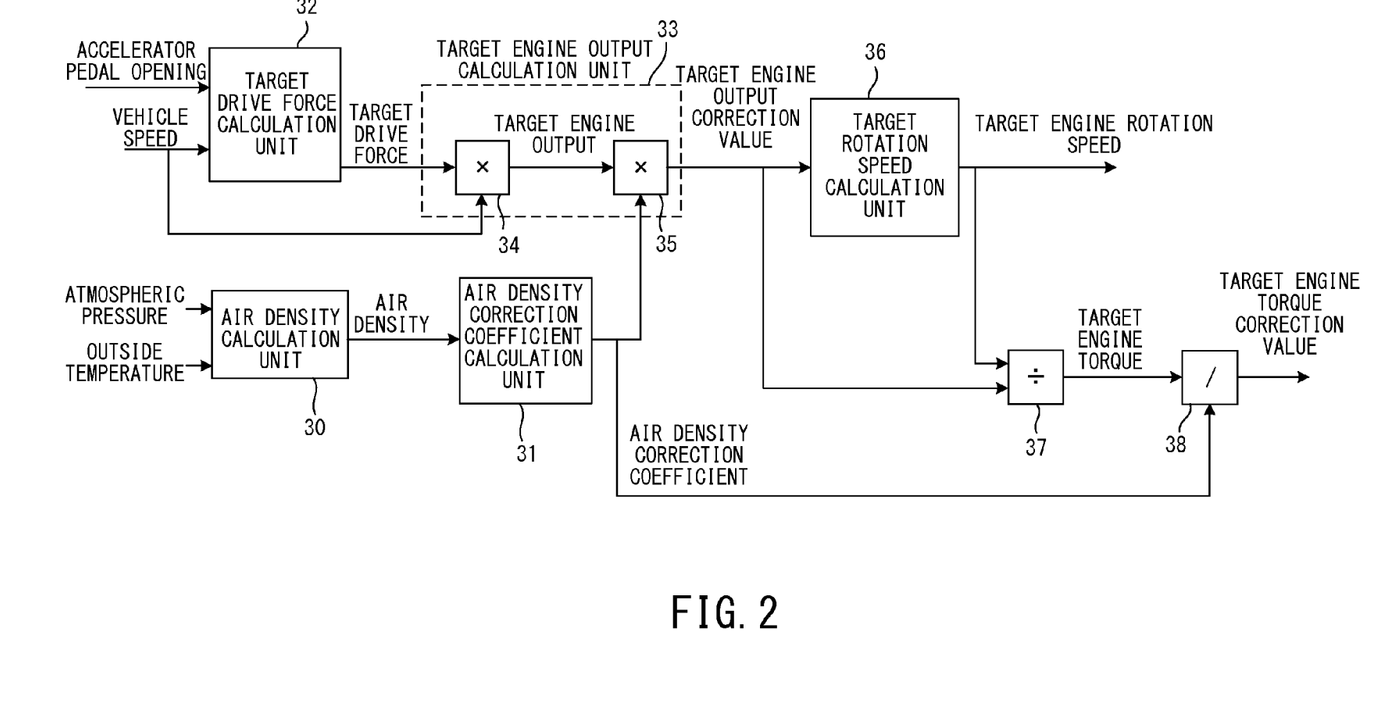
FIG. 2 is a block diagram for the calculation of a target engine torque correction value and a target engine rotation speed in the first embodiment.

Next, methods for calculating a target engine torque correction value and a target engine rotation speed in the present embodiment are described using FIG. 2. FIG. 2 is a block diagram for the calculation of the target engine torque correction value and the target engine rotation speed. Calculations described here are performed by the controller 3.

An air density calculation unit 30 calculates an air density based on the atmospheric pressure around the vehicle 100. Specifically, the air density is calculated by dividing the current atmospheric pressure detected by the atmospheric pressure sensor 21 by a standard air pressure. The air density is low, for example, when the vehicle 100 travels in highland.

Figure 3:
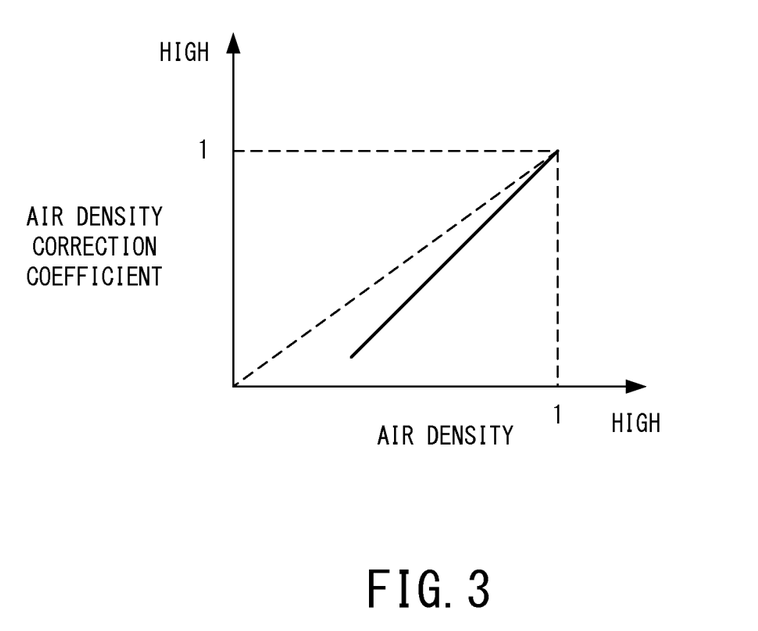
FIG. 3 is a map showing a relationship of air density and air density correction coefficient.

An air density correction coefficient calculation unit 31 calculates an air density correction coefficient from the air density based on a map shown in FIG. 3. FIG. 3 is a map showing a relationship of the air density and the air density correction coefficient. The air density correction coefficient is 1 when the air density is 1 and is smaller than 1 when the air density is lower than 1.

Figure 4:
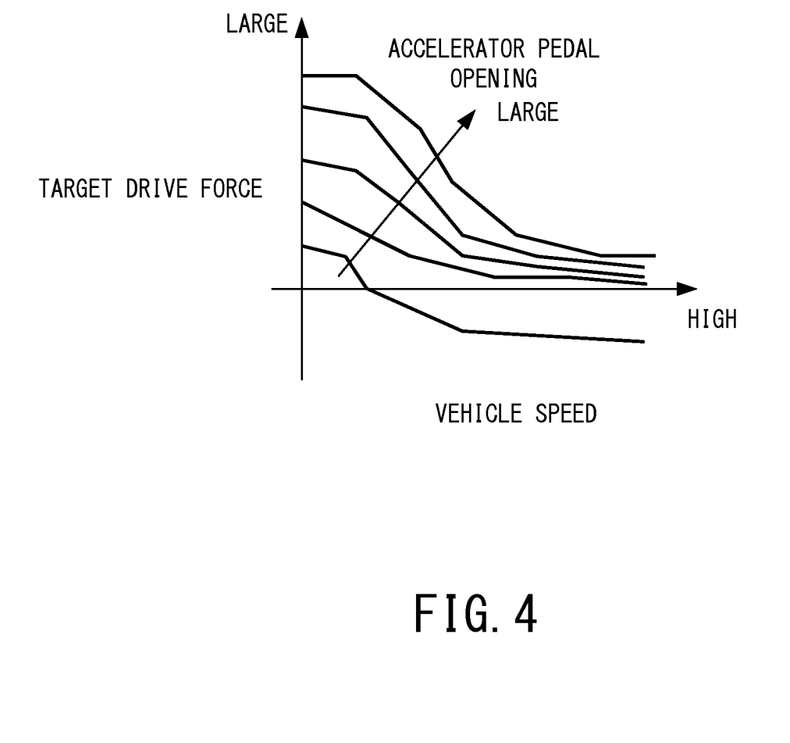
FIG. 4 is a map showing a relationship of accelerator pedal opening, vehicle speed and target drive force.

A target drive force calculation unit 32 calculates a target drive force from the accelerator pedal opening and the vehicle speed based on a map shown in FIG. 4. FIG. 4 is a map showing a relationship of the accelerator pedal opening, the vehicle speed and the target drive force. The target drive force becomes smaller when the vehicle speed increases and becomes larger when the accelerator pedal opening increases.

A target engine output calculation unit 33 is composed of a first target engine output calculation unit 34 and a second target engine output calculation unit 35.

The first target engine output calculation unit 34 calculates a target engine output by multiplying the target drive force and the vehicle speed.

The second target engine output calculation unit 35 calculates a target engine output correction value, which becomes a final target engine output, by multiplying the target engine output and the air density correction coefficient. The target engine output correction value is a value smaller than the target engine output calculated by the first engine output calculation unit 34 when the air density is lower than 1.

Figure 5:
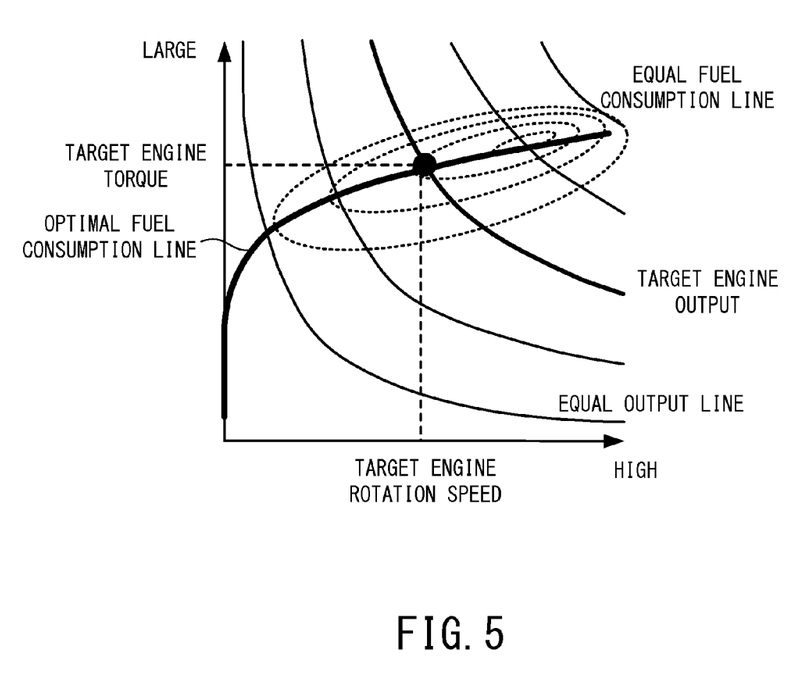
FIG. 5 is a map showing a relationship of target engine rotation speed, target engine output, target engine torque and optimal fuel consumption line.

A target rotation speed calculation unit 36 calculates a target engine rotation speed from the target engine output correction value based on a map shown in FIG. 5. FIG. 5 is a map showing a relationship of the target engine rotation speed, the target engine output, a target engine torque and an optimal fuel consumption line. Specifically, the target rotation speed calculation unit 36 calculates the target engine rotation speed, which provides optimal fuel consumption, from the target engine output correction value in accordance with the optimal fuel consumption line.

A target engine torque calculation unit 37 calculates the target engine torque by dividing the target engine output correction value by the target engine rotation speed. This target engine torque is a value which is not corrected based on the air density. If the engine 1 is controlled to generate this target engine torque, an actual engine torque is smaller than the target engine torque if the air density is low, thereby deviating from the optimal fuel consumption line shown in FIG. 5.

A target engine torque correction calculation unit 38 calculates a target engine torque correction value, which becomes a final target engine torque, by dividing the target engine torque by the air density. The target engine torque correction value is a value corrected based on the air density and is larger than the target engine torque when the air density is low. By controlling the engine 1 based on the target engine torque correction value, the actual engine torque becomes the target engine torque to provide an engine torque conforming to the optimal fuel consumption line shown in FIG. 5 even if the air density is low.

The controller 3 calculates a target speed ratio by dividing the target engine rotation speed by a secondary pulley rotation speed calculated from the vehicle speed and controls the automatic transmission 6 so that a speed ratio of the automatic transmission 6 reaches the target speed ratio. Here, it is assumed that the lock-up clutch is engaged and the engine rotation speed and the primary pulley rotation speed have the same value. Further, the controller 3 controls the engine 1 by controlling a throttle opening, fuel injection into the engine 1 and the like based on the target engine torque correction value.

Figure 6:
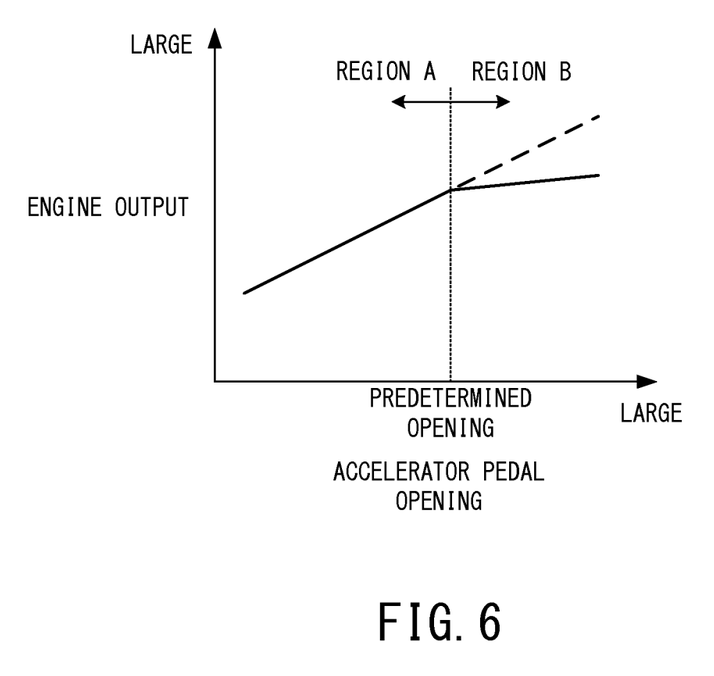
FIG. 6 is a map showing relationships of accelerator pedal opening and engine output when the first embodiment is not used.
Figure 7:
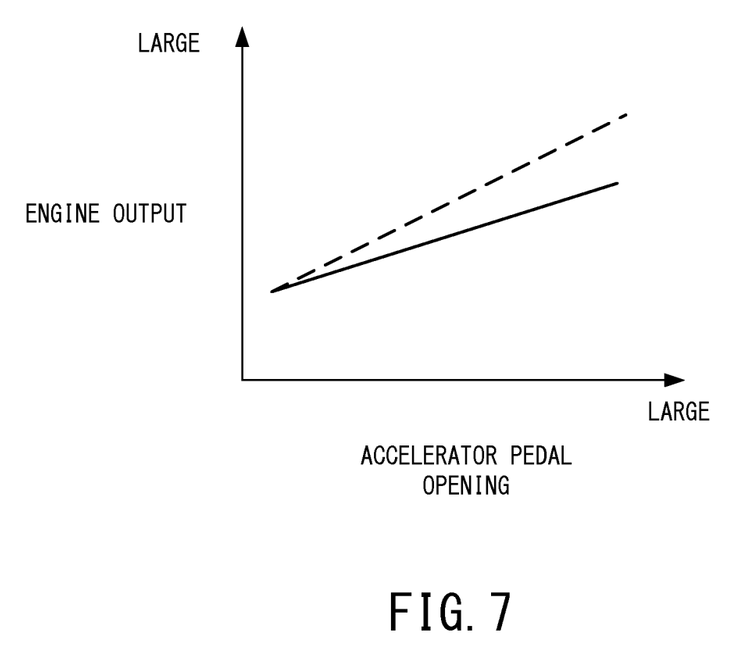
FIG. 7 is a map showing relationships of accelerator pedal opening and engine output when the first embodiment is used.

Relationships of the accelerator pedal opening and the engine output when the vehicle 100 is caused to travel using the present embodiment are described using FIGS. 6 and 7. Here, a case is assumed where the vehicle 100 travels in highland where the air density is low. FIG. 6 shows relationships of the accelerator pedal opening and the engine output in the vehicle 100 in which the target engine output is the one when the vehicle 100 travels in flatland where the air density is not low and the engine torque is corrected based on the air density without using the present embodiment. FIG. 7 shows relationships of the accelerator pedal opening and the engine output when the present embodiment is used. In FIGS. 6 and 7, the relationship of the accelerator pedal opening and the engine output when the vehicle 100 travels in flatland is shown in broken line and the relationship of the accelerator pedal opening and the engine output when the vehicle 100 travels in highland is shown in solid line.

When the present embodiment is not used, the engine output increases according to an increase of the accelerator pedal opening in a region where the accelerator pedal opening is smaller than a predetermined opening (region A in FIG. 6) if a driver depresses the accelerator pedal. Here, since the target engine output is set at the same value as in the case of traveling in flatland and the engine torque is corrected to be equal to the one in the case of traveling in flatland, the engine output is equal to the one in the case of traveling in flatland even in the case of traveling in highland.

However, in a region where the accelerator pedal opening is larger than the predetermined opening (region B in FIG. 6), an increase amount of the engine output decreases even if the accelerator pedal opening increases according to the depression of the accelerator pedal by the driver. This is because the engine torque reaches an upper limit value since the engine torque is increased to become equal to the engine output in the case of traveling in flatland. As just described, the increase amount of the engine output of the vehicle 100 decreases before and after the accelerator pedal opening crosses the predetermined opening, e.g. the increase amount of the engine output decreases while the accelerator pedal is being depressed, thereby giving a sense of incongruity to the driver and reducing driving performance of the vehicle 100.

In the present embodiment, the target engine output correction value is calculated based on the air density. When the air density is low, the target engine output correction value is reduced. Then, The target engine rotation speed and the target engine torque correction value based on the target engine output correction value are calculated and the engine 1 is controlled. Although the engine output becomes lower than the one in the case of traveling in flatland in this way, it can be suppressed that the engine torque reaches the upper limit value and the vehicle 100 can be caused to travel by gradually increasing the engine output according to the depression of the accelerator pedal by the driver. Thus, a reduction in the increase amount of the engine output while the accelerator pedal is being depressed can be suppressed and a reduction in driving performance of the vehicle 100 can be suppressed by not giving any sense of incongruity to the driver.

Effects of the first embodiment of the present invention are described.

By setting a smaller target engine output correction value, which becomes the final target engine output, when the air density is low than when the air density is high, the engine output can be increased according to the depression of the accelerator pedal and a reduction in driving performance of the vehicle 100 can be suppressed even if the accelerator pedal is depressed to increase the accelerator pedal opening. Further, by setting a larger target engine torque correction value, which becomes the final target engine torque, when the air density is low than when the air density is high, traveling in accordance with the optimal fuel consumption line can be enabled and fuel economy can be improved.

Next, a second embodiment of the present invention is described.

Parts of the second embodiment different from the first embodiment are described. The configuration of the vehicle 100 is the same as in the first embodiment.

Figure 8:
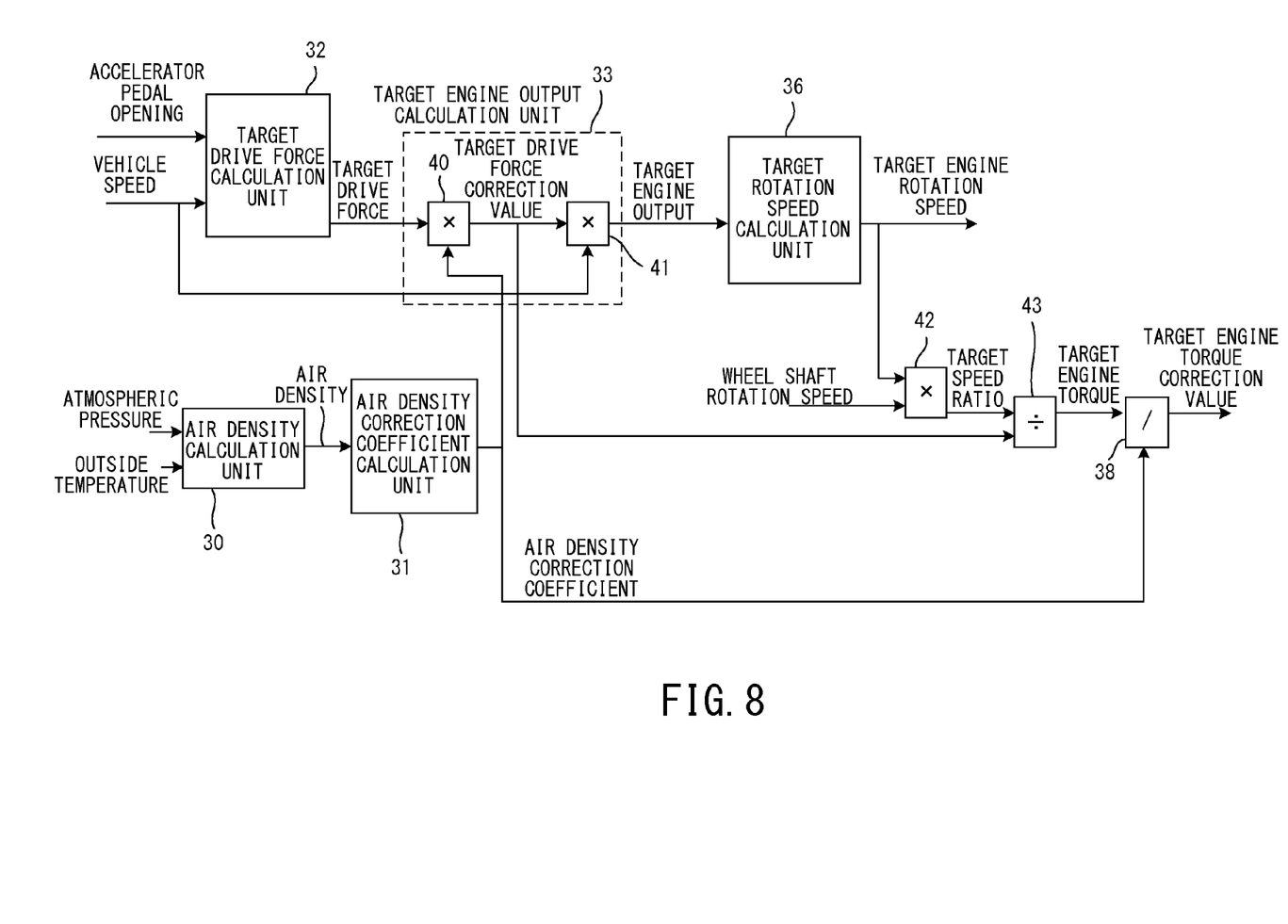
FIG. 8 is a block diagram for the calculation of a target engine torque correction value and a target engine rotation speed in a second embodiment.

The second embodiment differs from the first embodiment in the methods for calculating the target engine torque correction value and the target engine rotation speed. The methods for calculating the target engine torque correction value and the target engine rotation speed are described using FIG. 8. FIG. 8 is a block diagram for the calculation of the target engine torque correction value and the target engine rotation speed. The same calculation units as in the first embodiment are denoted by the same reference signs and not described here.

A first target engine output calculation unit 40 calculates a target drive force correction value by multiplying a target drive force and an air density correction coefficient.

A second target engine output calculation unit 41 calculates a target engine output by multiplying the target drive force correction value and a vehicle speed. This target engine output is a target engine output corrected based on the air density. A target rotation speed calculation unit 36 calculates the target engine rotation speed based on the calculated target engine output.

A rotation speed ratio calculation unit 42 calculates a rotation speed ratio by dividing the target engine rotation speed by a wheel shaft rotation speed detected by a vehicle speed sensor 23.

A target engine torque calculation unit 43 calculates a target engine torque by dividing the target drive force correction value by the rotation speed ratio.

Effects of the second embodiment of the present invention are described.

The same effects as in the first embodiment can be obtained also by the configuration of the present embodiment.

Next, a third embodiment of the present invention is described.

Figure 9:
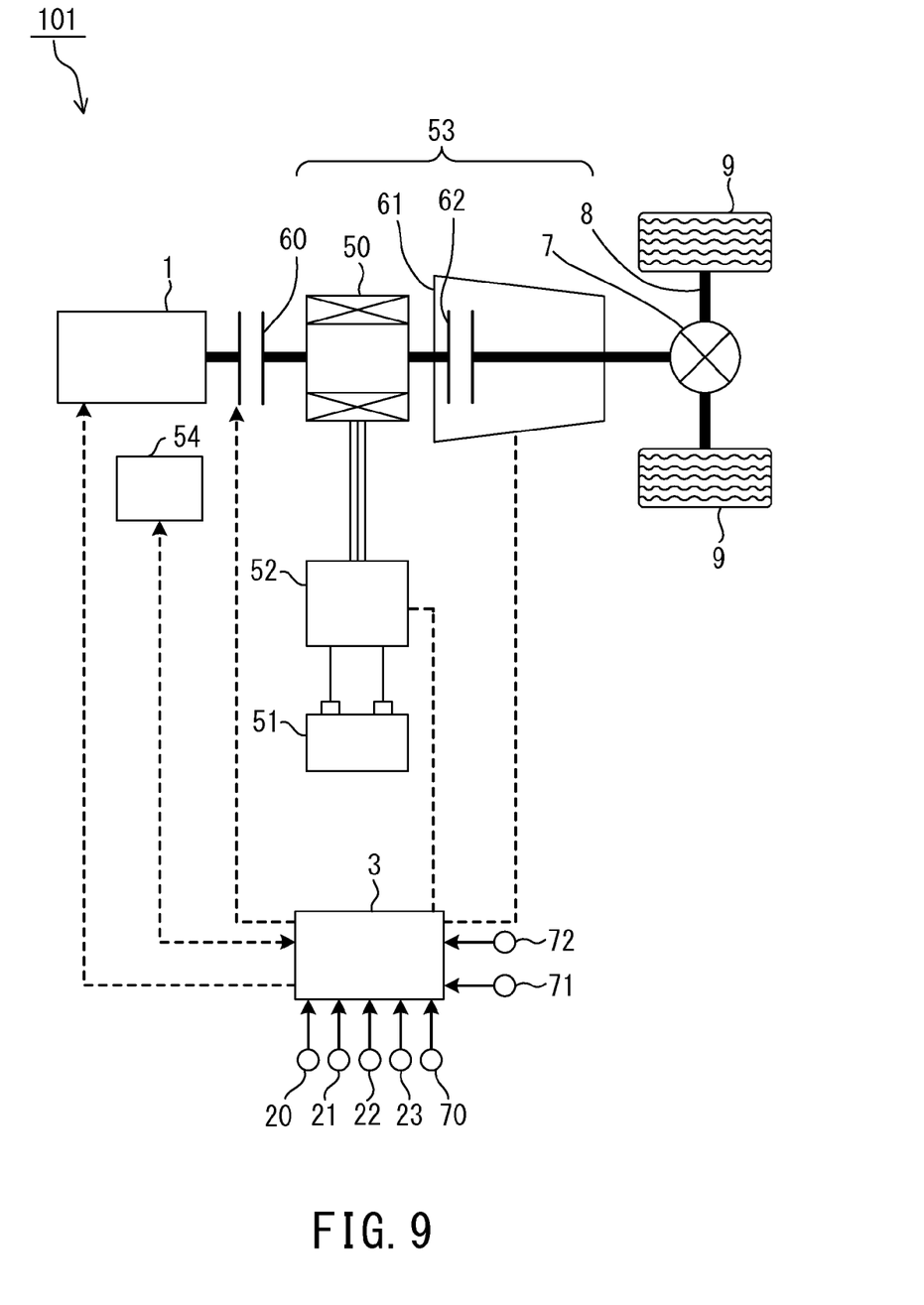
FIG. 9 is a schematic configuration diagram of a hybrid vehicle of a third embodiment.

A vehicle 101 of the present embodiment is a hybrid vehicle. FIG. 9 is a schematic configuration diagram of the hybrid vehicle of the present embodiment. The same components as in the first embodiment are denoted by the same reference signs as in the first embodiment and not described here.

The hybrid vehicle includes an engine 1 and a motor generator 50 as motive power sources, a battery 51 as an electric power source, an inverter 52 for controlling the motor generator 50, a drive system 53 for transmitting an output of the motive power source to wheels 9, an auxiliary machine 54, and a controller 3 for controlling the engine 1, the motor generator 50, the drive system 53 and the auxiliary machine 54.

The motor generator 50 is a synchronous type motor generator in which a permanent magnet is embedded in a rotor and a stator coil is wound around a stator. The motor generator 50 has a function as a motor to be rotated and driven upon receiving the supply of electric power and a function as a generator for generating electromotive forces at opposite ends of the stator coil when the rotor is rotated by an external force.

The battery 51 supplies electric power to various electrical components such as the motor generator 50 and stores electric power generated by the motor generator 50.

The inverter 52 is a current converter for converting two types of electricity, i.e. a direct current and an alternating current into each other. The inverter 52 supplies a direct current from the battery 51 to the motor generator 50 after converting it into a three-phase alternating current of an arbitrary frequency. On the other hand, when the motor generator 50 functions as a generator, a three-phase alternating current from the motor generator 50 is supplied to the battery 51 after being converted into a direct current.

The drive system 53 includes a first clutch 60, an automatic transmission 61, a second clutch 62, a final reduction differential device 7 and drive shafts 8.

The first clutch 60 is provided between the engine 1 and the motor generator 50. The first clutch 60 is a wet multi-disc clutch capable of continuously changing a torque capacity by controlling an oil flow rate and a hydraulic pressure by a first solenoid valve. The first clutch 60 is controlled in three states including an engaged state, a slip state (half-clutch state) and a released state by changing the torque capacity.

The automatic transmission 61 is a stepped transmission with seven forward gear positions and one reverse gear position. The automatic transmission 61 includes four sets of planetary gear mechanisms and a plurality of frictional engagement elements (three sets of multi-disk clutches, four sets of multi-disc brakes and two sets of one-way clutches) connected to a plurality of rotary elements constituting the planetary gear mechanisms to change linked states of those. A gear position is switched by adjusting a hydraulic pressure supplied to each frictional engagement element and changing an engaged/released state of each frictional engagement element.

The second clutch 62 is a wet multi-disc clutch capable of continuously changing the torque capacity by controlling the oil flow rate and the hydraulic pressure by a second solenoid valve. The second clutch 62 is controlled in three states including an engaged state, a slip state (half-clutch state) and a released state by changing the torque capacity. In the present embodiment, some of the plurality of frictional engagement elements provided in the automatic transmission 61 are used as the second clutch 62.

The auxiliary machine 54 operates when a part of the rotation of the engine 1 is transmitted thereto.

To the controller 3 are input a signal from an accelerator pedal opening sensor 20 for detecting an accelerator pedal opening, a signal from an atmospheric pressure sensor 21 for detecting an atmospheric pressure around the vehicle 101, a signal from a temperature sensor 22 for detecting an outside temperature, a signal from a vehicle speed sensor 23 for detecting a vehicle speed, a signal from a motor generator rotation speed sensor 70 for detecting a rotation speed of the motor generator 50, a signal from an SOC (State of Charge) sensor 71 for detecting an SOC of the battery 51, a signal from an engine rotation speed sensor 72 for detecting an engine rotation speed, a signal for transmitting an operational status of the auxiliary machine 54 and the like. The controller 3 controls the engine 1, the motor generator 50, the first clutch 60, the auxiliary machine 54 and the automatic transmission 61 based on the input signals.

Figure 10:
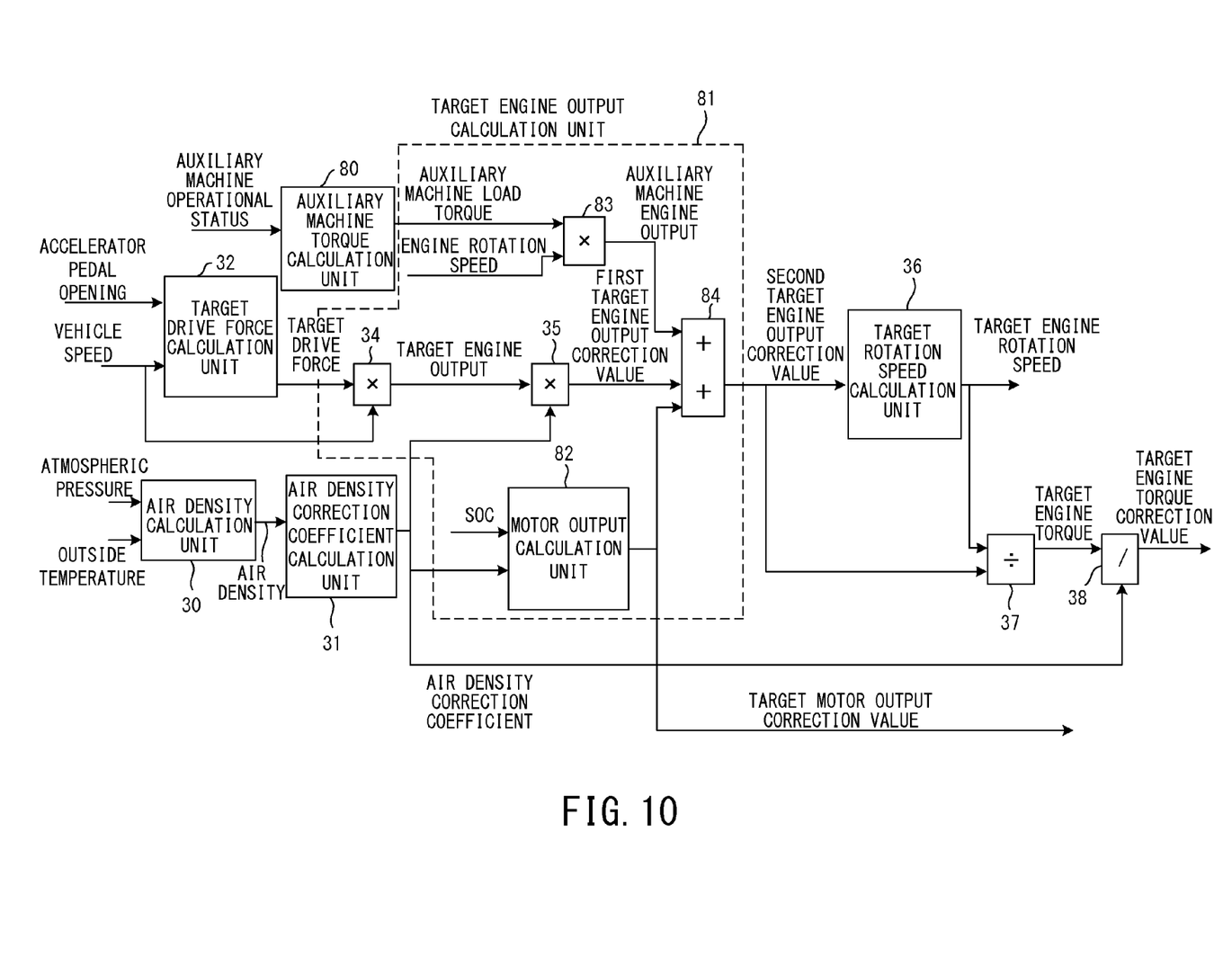
FIG. 10 is a block diagram for the calculation of a target engine torque correction value and a target engine rotation speed in a third embodiment.

Next, methods for calculating a target engine torque correction value and a target engine rotation speed are described using FIG. 10. FIG. 10 is a block diagram for the calculation of the target engine torque correction value and the target engine rotation speed. The same calculation units as in the first embodiment are denoted by the same reference signs as in the first embodiment and not described here.

An auxiliary machine torque calculation unit 80 calculates an auxiliary machine load torque necessary to operate the auxiliary machine 54 based on the operational status of the auxiliary machine 54.

A target engine output calculation unit 81 is composed of a first target engine output calculation unit 34, a second target engine output calculation unit 35, a motor output calculation unit 82, an auxiliary machine output calculation unit 83 and a third target engine output calculation unit 84.

The second target engine output calculation unit 35 calculates a first target engine output correction value (first engine output) by multiplying a target engine output and an air density correction coefficient.

The motor output calculation unit 82 calculates a target motor output correction value based on the SOC of the battery 51 and the air density correction coefficient. The motor output calculation unit 82 is described in detail using FIG. 11.

Figure 11:
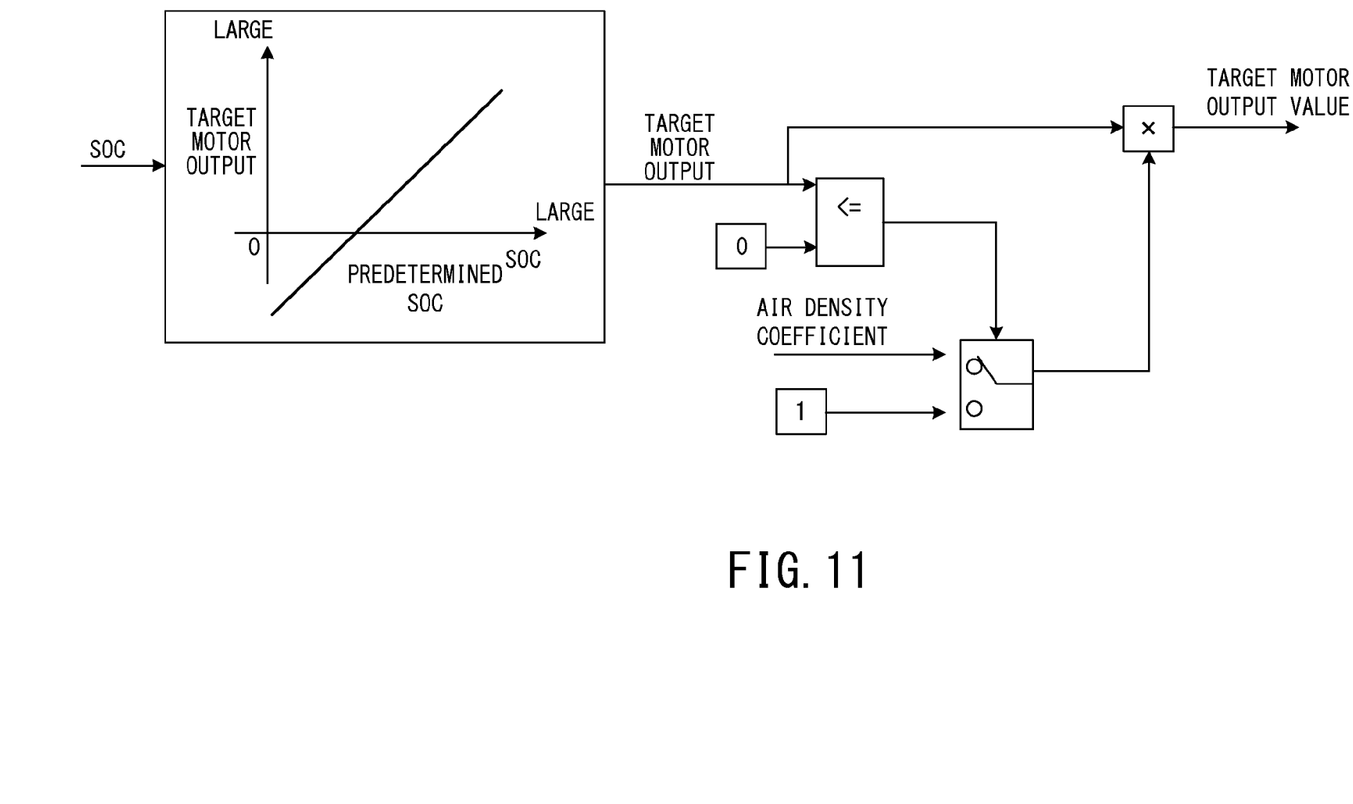
FIG. 11 is a block diagram showing the procedure of calculating a target motor output in a motor output calculation unit of the third embodiment.

The motor output calculation unit 82 calculates the target motor output based on a map showing a relationship of the SOC and the target motor output. When the SOC is lower than a predetermined SOC, the target motor output has a negative value. When the target motor output is positive, the motor generator 50 functions as a motor. When the target motor output is negative, the motor generator 50 functions as a generator and the motor generator 50 is driven to generate power by the engine 1. The predetermined SOC is a value which is set in advance and determines whether or not the battery 51 needs to be charged.

The motor output calculation unit 82 selects an air density coefficient and calculates a target motor output correction value (third engine output) by multiplying the target motor output and the air density coefficient when the target motor output is negative, i.e. when the motor generator 50 is driven to generate power by the engine 1. Since the air density coefficient is smaller than 1 when the air density is lower than 1, the absolute value of the target motor output correction value is a value smaller than that of the target motor output. Since the air density coefficient is 1 when the air density is 1, the absolute value of the target motor output correction value is equal to that of the target motor output. When the target motor output is negative, the target motor output correction value is a value corrected based on the air density.

The motor output calculation unit 82 selects 1 instead of the air density coefficient and calculates the target motor output correction value by multiplying the target motor output by 1 when the target motor output is positive, i.e. when the motor generator 50 functions as a motor. When the target motor output is positive, the target motor output correction value is a value not corrected based on the air density.

The auxiliary machine output calculation unit 83 calculates an auxiliary machine engine output (second engine output) by multiplying the auxiliary machine load torque and the engine rotation speed. The auxiliary machine engine output is a value not corrected based on the air density. If the engine output necessary to operate the auxiliary machine 54 is corrected based on the air density, it may not be possible to sufficiently operate the auxiliary machine 54 when the air density is low. Thus, the auxiliary machine engine output is not corrected according to the air density.

The third target engine output calculation unit 84 calculates a second target engine output correction value by adding the first target engine output correction value and the auxiliary machine engine output and subtracting the target motor output correction value. Since the target motor output correction value is a negative value when the motor generator 50 is driven to generate power by the engine 1, the target motor output correction value acts to increase the second target engine output correction value in this case.

The target engine rotation speed and the like are calculated using the second target engine output correction value in the target rotation speed calculation unit 36 and the like.

The controller 3 controls the automatic transmission 61 and the engine 1 and further controls the motor generator 50 based on the target motor output correction value.

Effects of the third embodiment of the present invention are described.

Since the auxiliary machine engine output necessary to operate the auxiliary machine 54 is not corrected based on the air density, the auxiliary machine engine output for operating the auxiliary machine 54 is certainly output from the engine 1 even if the air density is low and the second target engine output correction value is small. In this way, the shortage of the auxiliary machine engine output can be prevented and the auxiliary machine 54 can be sufficiently operated.

When the air density is low and the motor generator 50 is caused to generate power by the engine 1, the target motor output is corrected based on the air density to make the target motor output correction value smaller than the target motor output. In this way, it is possible to charge the battery 51 by generating power by the motor generator 50 while suppressing a reduction in driving performance of the vehicle 101.

Although the embodiments of the present invention have been described above, the above embodiments are merely some application examples of the present invention and not of the nature to limit the technical scope of the prevent invention to the specific configurations of the above embodiments.

Although the forward/reverse switching mechanism 5 is provided between the automatic transmission 6 and the engine 1 in the first and second embodiments, it may be provided between the automatic transmission 6 and the wheels 9.

Although a continuously variable transmission is used as the automatic transmission 6 in the first and second embodiments and a stepped transmission is used as the automatic transmission 61 in the third embodiment, there is no limitation to these. A stepped transmission may be used in the first and second embodiments and a continuously variable transmission may be used in the third embodiment.

Figure 12:
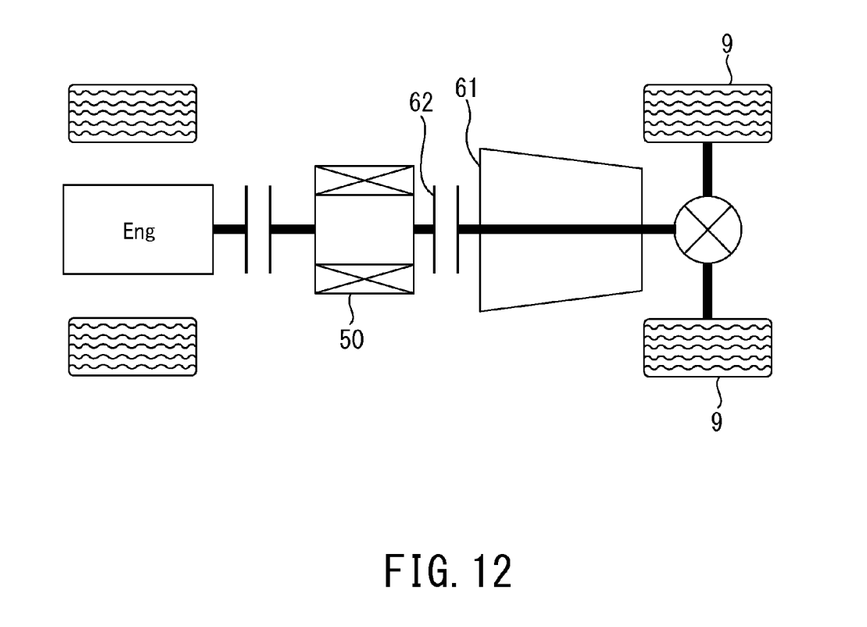
FIG. 12 is a diagram showing a modification of the embodiments.
Figure 13:
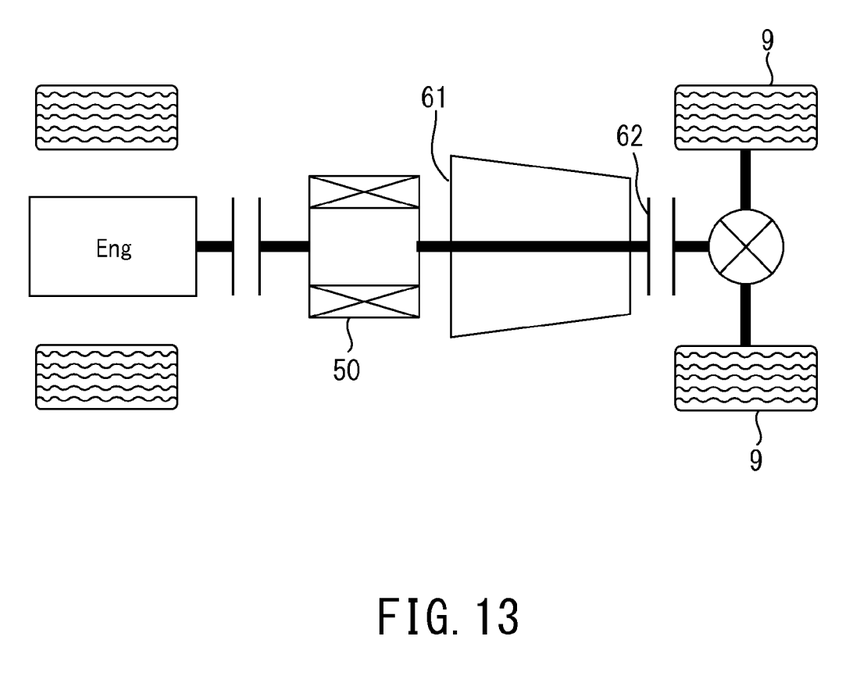
FIG. 13 is a diagram showing a modification of the embodiments.

Further, for example, the second clutch 62 of the hybrid vehicle may be separately provided between the motor generator 50 and the automatic transmission 61 as shown in FIG. 12 or may be separately provided behind the automatic transmission 61 as shown in FIG. 13. Without being limited to these, the second clutch 62 has only to be provided between the motor generator 50 and the wheels 9.

Although the air density is calculated based on the atmospheric pressure detected by the atmospheric pressure sensor 21 in the above embodiments, an altitude may be detected from information such as that of a car navigation system and the air density may be calculated based on the altitude. Further, the air density may be corrected based on the temperature detected by the temperature sensor 22.

The above embodiments or the above modifications may be combined.

The present application claims a priority of Japanese Patent Application No. 2012-180555 filed with the Japan Patent Office on Aug. 16, 2012, all the contents of which are hereby incorporated by reference.

The invention claimed is:

1. A vehicle control device for controlling a vehicle with an internal combustion engine, comprising:
    a target drive force calculation unit configured to calculate a target drive force based on a driving state of the vehicle;
    a vehicle speed detection unit configured to detect a vehicle speed of the vehicle;
    an air density calculation unit configured to calculate an air density;
    a target engine output calculation unit configured to calculate a target engine output of the internal combustion engine based on the target drive force, the vehicle speed and the air density; and
    a target engine torque calculation unit configured to calculate a target engine torque of the internal combustion engine based on the target engine output and the air density,
    wherein:
        the target engine output calculation unit is configured to set a smaller target engine output of the internal combustion engine as the air density becomes lower; and
        the target engine torque calculation unit is configured to set a larger target engine torque of the internal combustion engine as the air density becomes lower.

2. The vehicle control device according to claim 1, wherein:
    the target engine output calculation unit is configured to calculate the target engine output by adding a first engine output based on the target drive force and a second engine output for operating an auxiliary machine of the vehicle, to correct the first engine output based on the air density and not to correct the second engine output based on the air density.

3. The vehicle control device according to claim 1, wherein:
    the vehicle includes a motor generator capable of generating power by rotation produced in the engine; and
    the target engine output calculation unit is configured to correct a third engine output for generating power in the motor generator based on the air density when the motor generator is caused to generate power by the engine.

4. A vehicle control method for controlling a vehicle with an internal combustion engine, comprising:
    calculating a target drive force based on a driving state of the vehicle;
    detecting a vehicle speed of the vehicle;
    calculating an air density;
    calculating a target engine output of the internal combustion engine based on the target drive force, the vehicle speed and the air density; and
    calculating a target engine torque of the internal combustion engine based on the target engine output and the air density,
    wherein:
        calculating the target engine output comprises calculating a smaller target engine output of the internal combustion engine as the air density becomes lower; and
        calculating the target engine torque comprises calculating a larger target engine torque of the internal combustion engine as the air density becomes lower.

5. A vehicle control device for controlling a vehicle with an internal combustion engine, comprising:
    target drive force calculation means for calculating a target drive force based on a driving state of the vehicle;
    vehicle speed detection means for detecting a vehicle speed of the vehicle;
    air density calculation means for calculating an air density;
    target engine output calculation means for calculating a target engine output of the internal combustion engine based on the target drive force, the vehicle speed and the air density; and
    target engine torque calculation means for calculating a target engine torque of the internal combustion engine based on the target engine output and the air density,
    wherein:
        the target engine output calculation means sets a smaller target engine output of the internal combustion engine as the air density becomes lower; and
        the target engine torque calculation means sets a larger target engine torque of the internal combustion engine as the air density becomes lower.

* * * * *